United States Patent
Xie et al.

[19]

[11] Patent Number: 6,098,063
[45] Date of Patent: *Aug. 1, 2000

[54] DEVICE AND METHOD FOR IDENTIFYING CAUSES OF WEB BREAKS IN A PRINTING SYSTEM ON WEB MANUFACTURING ATTRIBUTES

[75] Inventors: Zhenhua Xie, Naperville; Did Bun Wong, Glen Ellyn, both of Ill.; Robert Evans, Gallatin, Tenn.

[73] Assignee: R. R. Donnelley & Sons, Lisle, Ill.

[*] Notice: This patent issued on a continued prosecution application filed under 37 CFR 1.53(d), and is subject to the twenty year patent term provisions of 35 U.S.C. 154(a)(2).

[21] Appl. No.: 08/846,890

[22] Filed: May 1, 1997

Related U.S. Application Data

[63] Continuation-in-part of application No. 08/196,707, Feb. 15, 1994, Pat. No. 5,694,524.

[51] Int. Cl.[7] .................................................. G06F 17/00
[52] U.S. Cl. ................................. 706/60; 706/48
[58] Field of Search ............................. 706/23, 12, 48, 706/60

[56] References Cited

U.S. PATENT DOCUMENTS

| | | | |
|---|---|---|---|
| Re. 31,312 | 7/1983 | Eddens | 73/862.48 |
| 3,822,838 | 7/1974 | Butler, Jr. et al. | 242/75.44 |
| 3,928,844 | 12/1975 | Meihofer | 226/11 |
| 3,950,988 | 4/1976 | Nowisch et al. | 73/144 |
| 4,130,014 | 12/1978 | Eddens | 73/144 |
| 4,186,309 | 1/1980 | Gnuechtel | 250/561 |
| 4,335,316 | 6/1982 | Glanz et al. | 250/559.4 |
| 4,359,178 | 11/1982 | Hayashi et al. | 226/25 |
| 4,532,500 | 7/1985 | Henk | 340/675 |

(List continued on next page.)

OTHER PUBLICATIONS

Kasunich et al., *Gravure Process and Technology*, Chs. 4, 6–9, 11–13, 15, pp. 37–64, 99–241, 259–362, 379–398 (Brett Rutherford ed. 1991).

Quinlan, *C4.5: Programs for Machine Learning* (1993).

Letter to applicant from Integral Solutions Limited, dated Apr. 27, 1992.

Bareiss et al., Supporting Start–to–Finish Development of Knowledge Bases, 4 Machine Learning, pp.. 259–283 (1989).

(List continued on next page.)

*Primary Examiner*—Tariq R. Hafiz
*Assistant Examiner*—Wilbert L. Starks, Jr.
*Attorney, Agent, or Firm*—Marshall, O'Toole, Gerstein, Murray & Borun

[57] ABSTRACT

A device and method that determine conditions under which a break in a web of a printing system is more likely to occur store data pertaining to one or more attributes associated with the manufacture of each web used in a plurality of printing runs. The device and method then implement a correlation analysis, such as a decision-tree induction analysis, using the stored data to determine if there is a correlation between the one or more web manufacturing attributes and the occurrence of a web break. The device and method may store web manufacturing data indicating one or more of a mill site, a web manufacturing machine, a date, a reel number, a reel set, a log position, any auxiliary web manufacturing equipment, a web tensile strength, a web moisture content and/or a coefficient of friction associated with the manufacture of the webs used in the plurality of printing runs.

39 Claims, 8 Drawing Sheets

U.S. PATENT DOCUMENTS

| | | | |
|---|---|---|---|
| 4,716,978 | 1/1988 | Wales et al. | 177/25 |
| 4,752,897 | 6/1988 | Zoeller et al. | 702/40 |
| 4,892,426 | 1/1990 | Steele | 400/708 |
| 4,959,040 | 9/1990 | Gardner et al. | 474/103 |
| 4,961,089 | 10/1990 | Jamzadeh | 399/165 |
| 5,036,706 | 8/1991 | Gnuechtel et al. | 73/597 |
| 5,136,686 | 8/1992 | Koza | 395/13 |
| 5,162,119 | 11/1992 | Pappas et al. | 425/92 |
| 5,188,028 | 2/1993 | Reichel | 101/228 |
| 5,243,408 | 9/1993 | Whitman, III | 356/430 |
| 5,266,995 | 11/1993 | Quadracci et al. | 355/77 |
| 5,269,222 | 12/1993 | Johnson et al. | 101/228 |
| 5,280,720 | 1/1994 | Heidt | 73/159 |
| 5,282,261 | 1/1994 | Skeirik | 706/23 |
| 5,285,238 | 2/1994 | Quadracci et al. | 355/77 |
| 5,301,866 | 4/1994 | Veh et al. | 226/11 |
| 5,325,445 | 6/1994 | Herbert | 382/225 |
| 5,325,774 | 7/1994 | Breton et al. | 101/228 |
| 5,357,812 | 10/1994 | Kübert et al. | 73/862 |
| 5,365,796 | 11/1994 | Lin et al. | 73/862 |
| 5,365,844 | 11/1994 | Miyashige | 101/228 |
| 5,378,871 | 1/1995 | Öttl | 250/571 |
| 5,414,708 | 5/1995 | Nigawara et al. | 395/75 |
| 5,457,515 | 10/1995 | Quadracci et al. | 355/132 |
| 5,521,844 | 5/1996 | Karis | 364/551.01 |
| 5,534,281 | 7/1996 | Pappas et al. | 426/383 |
| 5,652,388 | 7/1997 | Callan et al. | 73/628 |
| 5,694,524 | 12/1997 | Evans | 706/12 |
| 5,781,195 | 7/1998 | Marvin | 345/428 |
| 5,791,541 | 8/1998 | Jitsuishi et al. | 226/40 |

OTHER PUBLICATIONS

Clark et al., The CN2 Induction Algorithm, 3 Machine Learning, pp. 261–283 (1989).

Draper, Assessment and Propagation of Model Uncertainty, (draft version), in Proceedings of the Fourth International Workshop on Artificial Intelligence and Statistics, pp. 497–509 (1993).

Edelstein, *Mining for Gold*, 6 pgs. (Apr. 21, 1997).

Simoudis, Reality Check for Data Mining, IEEE Expert, pp. 25–33 (Oct. 1996).

Buntine, Operations on Counting Tables, Turing Institute, pp. 1–4 (Oct. 1989).

Buntine, Review and Questions on Learning Decision Trees, Turing Institute, pp. 1–6 (Oct. 1989).

Chou, Optimal Partitioning for Classification and Regression Trees, 13 IEEE Transactions on Pattern Analysis and Machine Intelligence, pp. 340–354 (1991).

Buntine, Learning Classification Trees, RIACS & NASA Ames Research Center, pp. 1–25 (Nov. 1991).

Oliver, Decision Graphs—An Extension of Decision Trees (Draft), Monash University, Australia, pp. 1–13 (Dec. 15, 1992).

Buntine et al., Introduction to IND Version 2.1 and Recursive Partitioning, IND User's Manual, NASA Ames Research Center, Dec. 31, 1992 (including a one page summary of IND Version 2.0 and a two page summary of modifications to IND Versions 0.1 to 2.1).

Buntine, *Tree Classification Software*, presented at The Third National Technology Transfer Conference and Exposition, Baltimore, pp. 1–10 (Dec. 1992).

W.F. Punch III ed., New NASA Software, Expert New Products, p. 97 (Aug. 1993).

XpertRule® Analyser™ Knowledge from Data, User's Guide (Release 2), published by Attar Software (1994).

ANGOSS KnowledgeSEEKER, Version 3.0, User's Guide, published by ANGOSS Software Intl., Ltd. (1984–1994).

Buntine, *Recursive Partitioning Skeleton Code*, pp. 1–2 (1990).

*Recursive Partitioning Skeleton Code*, pp. 1–2 (1990).

Michalski et al., Learning by Being Told and Learning From Examples: An Experimental Comparison of the Two Methods of Knowledge Acquisition in the Context of Developing an Expert System for Soybean Disease Diagnosis, 4 International Journal of Policy Analysis and Information Systems 125–161 (1980).

Musen, Automated Support for Building and Extending Expert Models, 4 Machine Learning 347–375 (1989).

Shannon et al., *The Mathematical Theory of Communication*, pp. 1–5, 30–64 (1963).

Tan et al., *Two Case Studies in Cost–Sensitive Concept Acquisition*, in Proceedings of the Eighth National Conference on Artificial Intelligence, 854–860 (1990).

Walsh, *Handbook of Nonparametric Statistics*, pp. 10, 50, 194–195, 290, 300 (1962).

Weiss et al. *Computer Systems that Learn*, Chs. 5–7, pp. 113–203 (1991).

Anderson, *The Adaptive Character of Thought*, pp. 1, 5–40 (1990).

Fayyad et al., On the Handling of Continuous–Valued Attributes in Decision Tree Generation, 8 Machine Learning, pp. 87–102 (1992).

Mantaras, A Distance–Based Attribute Selection Measure for Decision Tree Induction, 6 Machine Learning, pp. 81–92 (1991).

Padalkar et al., Real–Time Fault Diagnostics, IEEE Expert 75–85 (Jun. 1991).

Quinlan, Induction of Decision Trees, 1 Machine Learning, pp. 81–106 (1986).

Shavlik et al., Symbolic and Neural Learning Algorithms: An Experimental Comparison, 6 Machine Learning, pp. 111–143 (1991).

Smith et al., *Categories and Concepts*, Chs. 1, 2, 8, pp. 1–21, 162–182 (1981).

Weiss et al., *An Empirical Comparison of Pattern Recognition, Neural Nets, and Machine Learning Classification Methods,* Proceedings of the Eleventh International Joint Conference on Artificial Intelligence, pp. 781–787 (1989).

Fisher, Knowledge Acquisition Via Incremental Conceptual Clustering, 2 Machine Learning, pp. 139–172 (1987).

Rich, *Artificial Intelligence,* (1983).

Mingers, An Empirical Comparison of Pruning Methods for Decision Tree Induction, 4 Machine Learning, pp. 227–243 (1989).

Whitehall et al., CAO: A Machine Learning Tool for Engineering, vol. 5, No. 4, Artificial Intelligence in Engineering, pp. 189–198 (1990).

Schlimmer, Incremental Adjustment of Representations for Learning, Proceedings of the Fourth International Workshop on Machine Learning, pp. 79–90 (1987).

Lu et al., A Machine Learning Approach to the Automatic Synthesis of Mechanistic Knowledge for Engineering Decision–Making, 1 AI EDAM, pp. 109–118 (1987).

Buntine et al., Interactive Induction, 12 Machine Intelligence 121–137 (Hayes–Michie et al. eds. 1990).

Clark et al., *Using Qualitative Models to Guide Inductive Learning,* Proceedings of the Tenth International Machine Learning Conference, pp. 49–56 (1993).

Irani et al., Applying Machine Learning to Semiconductor Manufacturing, IEEE Expert, pp. 41–47 (1993).

Kerber, *ChiMerge: Discretization of Numeric Attributes,* Proceedings of the Tenth National Conference on Artificial Intelligence, pp. 123–127 (1992).

Porter et al., Concept Learning and Heuristic Classification in Weak–Theory Domains, 45 Artificial Intelligence, pp. 229–263 (1990).

Evans, An Application of ID3 Using Real Valued Features, (1991).

Evans et al., Overcoming Process Delays with Decision Tree Induction, IEEE Expert, pp. 60–66 (1994).

Brochure by Integral Solutions Limited, ISL—Rules—A Powerful Tool for Generating Embeddable Rules (1989).

Letter to applicant from Infolink Decision Services Limited, dated Jan. 27, 1994.

Integral Solutions Limited, *Catalyst Catalog,* p. 47 (1991).

Wang et al., *A Brain Tumor Diagnostic System with Automatic Learning Abilities,* Proceedings of Third Annual IEEE Symposium on Computer–Based Medical Systems, pp. 313–320 (Jun. 1990).

Simpson, W.R.; Sheppard, J.W., The Multicriterion Nature of Diagnosis, Proceedings, IEEE Systems Readiness Technology Conference, pp. 389–395, Sep. 20, 1993.

Hunt, K. J., Induction of Decision Trees for Rule Based Modelling and Control, International Symposium on Intelligent Control, 1992, Proceedings of the 1992 IEEE, pp. 306–311, Aug. 11, 1992.

Love, Daniel J., Failure Analysis of Low–Voltage Power and Control Circuits, IEEE Transactions on industry applications, vol. 27, No. 5, Sep. 1, 1991.

DEVICE AND METHOD FOR IDENTIFYING CAUSES OF WEB BREAKS IN A PRINTING SYSTEM ON WEB MANUFACTURING ATTRIBUTES

RELATED APPLICATION

This is a continuation-in-part of U.S. patent application Ser. No. 08/196,707, filed Feb. 15, 1994, now U.S. Pat. No. 5,694,524.

TECHNICAL FIELD

The present invention relates generally to printing systems and more particularly to a method and device that identifies conditions leading to, and that decreases the occurrence of, web breaks within a printing system.

BACKGROUND ART

Large-scale printing systems, such as rotogravure printing presses, feed a continuous web of material, typically paper, through printing machinery that forces the web into contact with one or more rotogravure printing cylinders which, in turn, print images onto the web in a standard manner. Thereafter, the web is cut into individual pages or signatures which are collated to produce, for example, newspapers, books, magazines, etc. A common and recurring problem in large-scale printing systems is the occurrence of web breaks, which happen when the web tears while the web is being fed through the individual components of the printing system. Upon the occurrence of a web break, the printing system must be shut down, the torn web must be dislodged from the individual components of the printing system and then the web must be re-fed through the printing system, all of which takes a considerable amount of time and results in wasted paper and ink. Furthermore, in some instances, web breaks may result in damage to components of the printing system.

While web breaks are a common problem in the printing industry, the reasons or conditions that lead to the occurrence of any particular web break vary a great deal. In fact, web breaks may be caused by different factors or by different combinations of factors at different times in the same printing system. Generally, web breaks are avoided by having a local expert, such as a printing press foreman, oversee the press conditions and make suggestions for changes based mainly on past experiences with web breaks, trial and error and general rules of thumb. While some of these approaches are successful in decreasing the incidence of web breaks in the short term, web breaks usually reappear later with very little indication as to the real cause of the reappearance. Furthermore, while local printing experts are usually capable of determining the general cause of any particular web break after the web break has occurred and, moreover, are generally capable of altering press conditions to eliminate a particular cause of a web break in the short term, there is no guarantee that the altered conditions will not result in further web breaks for other reasons or that the press conditions suggested by the local expert will be implemented in the press for a long period of time.

It is generally known that one of the most common conditions leading to the occurrence of a web break is excessive tension within the web at one or more locations within the printing system. Generally speaking, a discrete amount of tension must be present in the web to assure that the different printing cylinders of the printing system begin to register on the web at the same location. Slack within the web may cause misalignment between the different images which, in turn, produces an inferior product. However, as noted above, too much tension at any particular location leads to web breaks. Unfortunately, even with this rule of thumb, it is not generally known what the tension at any particular web location should be to decrease the likelihood of web breaks or, for that matter, why some tensions are better than others.

Recently, it has been suggested to use an expert system to determine the causes of problems, such as web breaks, within a printing press. In particular, the above-identified parent application on which this application relies for priority, is directed to the use of a decision-tree induction analysis that identifies conditions leading to a particular result, such as web breaks, within a printing system. In general, expert systems are used to mimic the tasks of an expert within a particular field of knowledge or domain, or to generate a set of rules applicable within the domain. In these applications, expert systems must operate on objects associated with the domain, which may be physical entities, processes or even abstract ideas. Objects are defined by a set of attributes or features, the values of which uniquely characterize the object. Object attributes may be discrete or continuous.

Typically, each object within a domain also belongs to or is associated with one of a number of mutually exclusive classes having particular importance within the context of the domain. Expert systems that classify objects from the values of the attributes for those objects must either develop or be provided with a set of classification rules that guide the system in the classification task. Some expert systems use classification rules that are directly ascertained from a domain expert. These systems require a "knowledge engineer" to interact directly with a domain expert in an attempt to extract rules used by the expert in the performance of his or her classification task.

Unfortunately, this technique usually requires a lengthy interview process that can span many man-hours of the expert's time. Furthermore, experts are not generally good at articulating classification rules, that is, expressing knowledge at the right level of abstraction and degree of precision, organizing knowledge and ensuring the consistency and completeness of the expressed knowledge. As a result, the rules that are identified may be incomplete while important rules may be overlooked. Still further, this technique assumes that an expert actually exists in the particular field of interest. Even if an expert does exist, the expert is usually one of a few and is, therefore, in high demand. As a result, the expert's time and, consequently, the rule extraction process can be quite expensive.

It is known to use artificial intelligence within expert systems for the purpose of generating classification rules applicable to a domain. For example, an article by Bruce W. Porter et al., *Concept Learning and Heuristic Classification in Weak-Theory Domains*, 45 Artificial Intelligence 229–263 (1990), describes an exemplar-based expert system for use in medical diagnosis which removes the knowledge engineer from the rule extraction process and, in effect, interviews the expert directly to determine relevant classification rules.

In this system, training examples (data sets that include values for each of a plurality of attributes generally relevant to medical diagnosis) are presented to the system for classification within one of a predetermined number of classes. The system compares a training example with one or more exemplars stored for each of the classes and uses a set of classification rules developed by the system to determine the class to which the training example most likely belongs. A domain expert, such as a doctor, either verifies the classification choice or instructs the system that the chosen classification is incorrect. In the latter case, the expert identifies the correct classification choice and the relevant attributes, or values thereof, that distinguish the training example from the class initially chosen by the system. The system builds the classification rules from this information, or, if no rules can be identified, stores the misclassified training example as an exemplar of the correct class. This process is repeated for training examples until the system is capable of correctly classifying a predetermined percentage of new examples using the stored exemplars and the developed classification rules.

A patent to Karis (U.S. Pat. No. 5,521,844) discloses a case-based expert system that may be used to aid in the identification of the cause of a particular problem, such as a web break, in a printing system. The expert system disclosed in the Karis patent stores data related to a set of previous printing runs or cases in which the problem, e.g., a web break, actually occurred. An expert then goes through the cases and identifies the most likely reason or reasons that the problem occurred in each case. These reasons are then stored in the memory of the expert system and, thereafter, the stored cases, along with the cause and effect reasoning provided by the expert are used to classify the cause(s) of the problem when it arises later. Unfortunately, the Karis system requires the use of an expert to originally identify the most probable cause(s) of the problem and, thus, is totally dependent on the expert's knowledge and reasoning. The Karis system does not identify causes which were never identified by the expert because, for example, the expert did not connect the problem to a particular cause or because the cause did not result in the problem in one of the cases reviewed by the expert. Furthermore, the Karis system does not store or collect data pertaining to printing runs in which the problem did not occur. As a result, the Karis system cannot perform a data mining technique, i.e., one in which causes are determined based on the data from both printing runs in which the problem did occur and printing runs in which the problem did not occur.

Other artificial intelligence methods that have been used in expert systems rely on machine induction in which a set of induction rules are developed or are induced directly from a set of records, each of which includes values for a number of attributes of an object and an indication of the class of the object. An expert then reviews the induced rules to identify which rules are most useful or applicable to the classification task being performed. Such a system is disclosed in the above-identified parent application. This method has the advantage of using the expert in a way that the expert is accustomed to working, that is, identifying whether particular rules are relevant or useful in the classification task. It should be noted, however, that all of the relevant attributes of the objects being classified must be identified and data for those attributes must be provided within the records in order for the system to induce accurate and complete classification rules.

A classic example of a pure machine induction technique is described in an article by J. R. Quinlan, *Induction of Decision Trees,* 1 Machine Learning 81–106 (1986), the disclosure of which is hereby incorporated by reference herein. This technique searches through relations between combinations of attribute values and classes of objects to build an induction tree which is then used to generate precise classification rules. During operation, the Quinlan method calculates a statistical measurement, referred to as an information gain value, for each of a set of attributes and chooses the attribute with the highest information gain value at a root of the tree. The attribute values associated with chosen attribute are then identified as nodes of the tree and are examined. If all of the data records associated with a node are all of the same class, the node is labeled as a leaf or endpoint of the induction tree. Otherwise, the node is labeled as a branching point of the induction tree. The method then chooses a branching point, calculates the information gain value for each of the remaining attributes based on the data from the records associated with the chosen branching point, chooses the attribute with the highest information gain value and identifies the attribute values of the chosen attribute as nodes which are examined for leaves and branching points. This process is repeated until only leaves remain within the induction tree or until, at any existing branching point, there are no attributes remaining upon which to branch. After an induction tree is constructed, classification rules are generated therefrom by tracing a path from a particular leaf of the induction tree to the root of the induction tree or vice versa.

As noted above, choosing the appropriate variables or attributes for such an expert system is an important step in identifying the cause of a problem such as web breaks. Without the appropriate choice of attributes, the expert system can be practically useless in actually determining the causes of problems such as web breaks in a printing system.

SUMMARY OF THE INVENTION

The present invention is directed to a device and a method that identify conditions leading to web breaks within a printing system based on web manufacturing attributes and/or printing attributes such as web tensions. The device and method may alert a user to the fact that a condition that is likely to result in a web break exists and/or may automatically control the printing system to prevent or eliminate a condition that is likely to result in a web break.

According to the present invention, a method and a device for determining conditions under which a break in a web of a printing system is more likely to occur, store, in a database, web manufacturing data indicating one or more web manufacturing attributes of the webs used in each of a plurality of printing runs. The device and method also implement a correlation analysis to determine if there is a correlation between the one or more web manufacturing attributes and the occurrence of a web break. The database may store web manufacturing data indicating one or more of a mill site, a web manufacturing machine, a date, a reel number, a reel set, a log position, any auxiliary web manufacturing equipment, a web tensile strength, a web moisture content and/or a coefficient of friction associated with the manufacture of each of the webs used in each of the plurality of printing runs.

Preferably, the device and the method implement a decision-tree induction algorithm that creates an induction tree using the web manufacturing data. The device and method may also display an indication of a correlation between the one or more web manufacturing attributes and the occurrence of a web break when such a correlation is determined. If desired, the device and method may also store printing attribute data, such as web tension data, associated with each of the plurality of printing runs and determine if there is a correlation between, on the one hand, any combination the web manufacturing attributes and the printing attributes and, on the other hand, the occurrence of a web break.

DESCRIPTION OF THE PREFERRED EMBODIMENT

Figure 1:
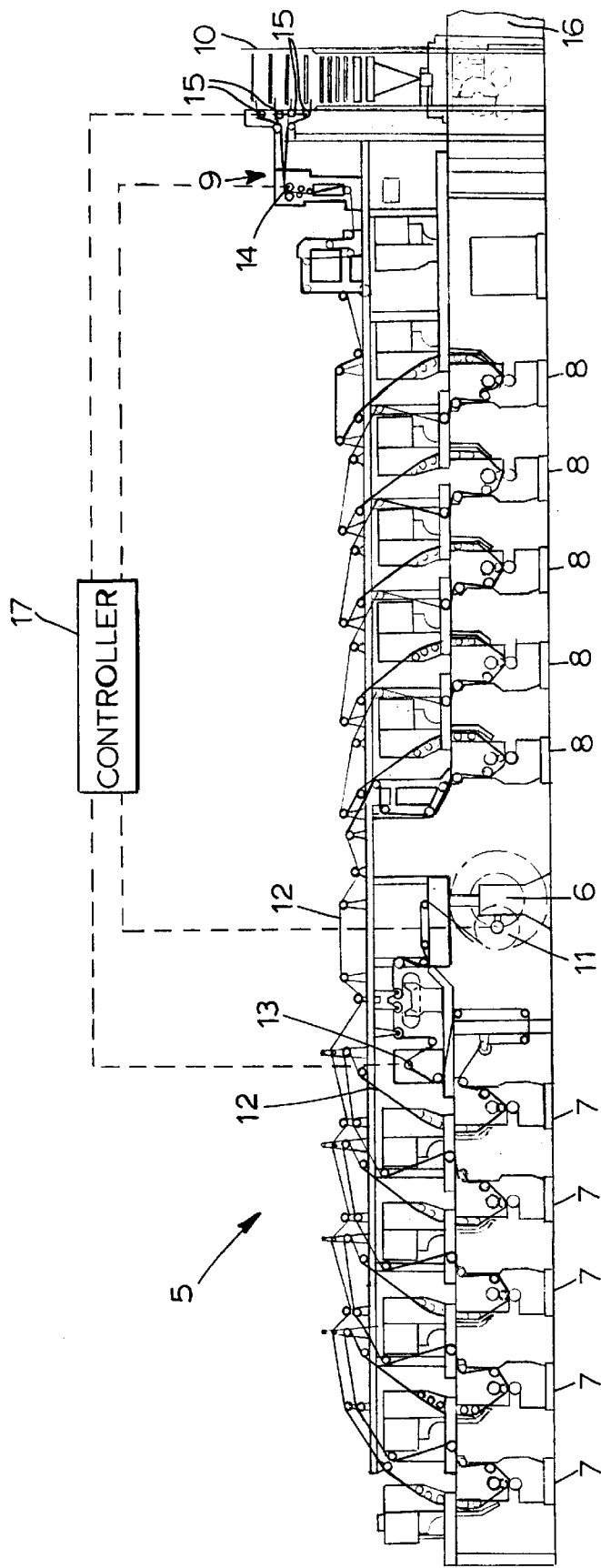
FIG. 1 is a partial block and partial schematic diagram of a printing system having a controller according to the present invention therein.

Referring now to FIG. 1, a standard printing system 5, which may be a rotogravure printing press, includes a reel support 6, various printing stations 7 and 8, a ribbon cutter 9 and a folder/cutter 10. A reel 11 having a web 12 made of, for example, paper, is mounted on the reel support 6 and is driven to feed the web 12 over an infeed roller 13, through the printing stations 7, which print an image on one side of the web 12, back over the printing stations 7 and the reel 11 and then through the printing stations 8, which print an image on the other side of the web 12. Preferably, there are five printing stations 7 and 8 for each side of the web 12. Each of the printing stations 7 and 8 includes printing cylinders that print one of cyan, magenta, yellow or key (black) ink onto the web 12 or that print type onto the web 12. However, any other number of printing stations 7 and/or 8 may be used for printing any other colors or image types onto the web 12.

After being delivered through the printing stations 7 and 8, the web 12 is delivered over a drag roller 14 and is then cut along the length thereof by a the ribbon cutter 9 into, for example, four ribbons of equal width. Each of the ribbons is fed over or around a ribbon roller 15 and is then compiled or stacked with the other ribbons in the folder/cutter 10. Thereafter, the stacked ribbons are cut along the width thereof to form a set of pages or signatures, that are folded into a book which, in turn, is delivered to a mail table 16 for delivery to a customer, all as generally known in the art.

During operation of the printing system 5, power is applied to the reel 11, to the infeed roller 13, to the drag roller 14 and to the ribbon rollers 15 to control movement of the web 12 through the printing system 5. Of course, to assure that power is transferred to the web 12 at these locations, the web 10 is held taught against these rollers which, in turn, creates a tension in the web 12 at these locations. In particular, the reel 11 applies a reel tension to the web 12 as it leaves the reel 11, the infeed roller 13 applies an infeed tension to the web 12 passing thereover, the drag roller 14 applies a drag tension to the web 12 and each of the ribbon rollers 15 applies a ribbon tension to a portion of the web 12. As is known, load cells may be located on each of the reel 11, the infeed roller 13, the drag roller 14 and the ribbon rollers 15 to measure the tension on the web 12 at these locations. Of course such load cells usually measure the force applied to the web 12 in, for example, pounds, which can be converted to pounds per linear inch (PLI) based on the width of the web (or ribbon) passing over the rollers 11, 13, 14, and 15. If desired, however, other tension measurement devices, such as pressure transducers, may be used to measure the tension in the web 12 at these or at any other locations.

While it is common practice to adjust the reel, infeed, drag and/or ribbon tensions in the web 12 to control the printing system 5 in an effort to prevent the occurrence of web breaks within the web 12, there has been, before now, no standardized approach to adjusting these or other web tensions together to reduce web breaks. Thus, as noted above, while adjusting one or more of the above-identified web tensions may alleviate web breaks for a short period of time, web breaks tend to reoccur with no apparent explanation or correlation to the specific web tensions being used. It has been discovered however, that while web breaks are not necessarily correlated to any specific web tension at any specific location within the web 12, web breaks are correlated with the ratio of different web tensions at different locations within the printing system 5. In other words, it is not only the values of the web tensions at particular web locations that are indicative of impending web breaks but, additionally, the ratio of two web tensions at different locations within the web 12 that indicates when a web break is more likely to occur within the printing system 5. As a result, web breaks may be reduced in the printing system 5 by keeping one or more web tension ratios at one or more values or ranges that have been predetermined as values or ranges at which web breaks are less likely to occur within the printing system 5.

To reduce web breaks based on web tension ratios, a controller 17, which may be any standard printing system controller including, for example, any analog or digital or hardwired processor or microprocessor, is connected to the printing system 5. The controller 17 may be coupled to two or more of the load cells or other tension measurement devices at, for example, the reel 11, the infeed roller 13, the drag roller 14, the ribbon rollers 15, etc. to measure the reel tension, the infeed tension, the drag tension, the ribbon tension, etc. of the web 12. The controller 17 then calculates the ratio of two measured tensions and compares this calculated ratio to a predetermined value or range to determine if the calculated ratio is at the predetermined value or within the predetermined range. If the calculated ratio is not at the predetermined value or within the predetermined range, the controller 17 may alert a user using an appropriate alarm, such as a bell, a whistle, a display device (such as a CRT, a flashing light etc.) or any other display or indicating unit to indicate that either one or both of the measured tensions should be adjusted to force the tension ratio back to the predetermined value or within the predetermined range. Of course, the controller 17 may measure any number of different tensions, may calculate any desired number of different tension ratios based on those measurements, may compare those tension ratios with different respective ratio values or ranges and may alert a user when one or more of the calculated ratios falls outside of a predetermined value or range.

If desired, the controller 17 may be connected to, for example, tension control power sources for the reel 11, the infeed roller 13, the drag roller 14, the ribbon rollers 15 or any other tension control devices within the printing system 5 to automatically increase or decrease the tension at one or more of the web locations to force the determined tension ratio(s) back to its (their) respective predetermined value(s) or back within its (their) respective predetermined range(s). In this manner, the controller 17 operates to reduce the occurrence of future web breaks based on one or more calculated tension ratios determined from actually measured web tensions.

It has been found particularly desirable to determine and control one or more of the ratio of the infeed tension to the reel tension, the ratio of the drag tension to the infeed tension and/or the ratio of the ribbon tension to the drag tension to reduce the occurrence of web breaks within the printing system 5. Furthermore, in a particular embodiment, it has been discovered advantageous to keep the ratio of the infeed tension to the reel tension of the printing system 5 at approximately (within the range of) 1.0 or, alternatively, within the range of 0.85 to 1.15. Of course, this range may change depending upon the type of web being used and the type of printing system being controlled as well as other factors specific to the individual printing system/web combination. Of course, tension ratios other than those identified herein may be used as well.

As will be understood, the particular tension ratio that leads to reduced web breaks within the printing system 5 may differ for different printing systems and may, in fact, differ for different conditions within any individual printing system, because, for example, different types of web materials are used within that printing system. As a result, it is advisable to identify the particular predetermined tension ratio value or range that is appropriate for reducing web breaks in each different printing system for each tension ratio upon which tension control is being based. While such tension ratio values or ranges may be determined by, for example, trial and error methods or any other desired method, an appropriate tension ratio value and/or range for any particular tension ratio is preferably determined from data indicating relevant tensions (or tension ratios) of the web 12 for prior runs of the printing system 5 in which both web breaks occurred and web breaks did not occur.

Thus, according to a preferred embodiment, a database, which may be located in the controller 17 or elsewhere, stores data indicating two or more web tensions (or one or more web tension ratios) for a plurality of printing runs along with an indication of whether a web break occurred or did not occur at those tensions (or tension ratios) within each of the plurality of printing runs. Typically, a printing run in this context is defined by printing associated with one entire reel 11, i.e., printing associated with each reel 11 loaded onto the reel stand 6 of the printing system 5. The collected and stored data may indicate, for example, two or more of the reel tension, the infeed tension, the drag tension and the ribbon tensions or one or more of, for example, the ratio of the infeed tension to the reel tension, the ratio of the drag tension to the infeed tension, the ratio of the ribbon tension to the drag tension and/or any other desired tension ratio. Thereafter, any desired method of identifying a proper tension ratio value or range that results in reduced web breaks based on the stored data may be used. Such methods may include the use of, for example, a neural network, any correlation analysis, an expert system, etc. However, a preferred method of identifying one or more proper tension ratio values or ranges that result in reduced web breaks uses a decision tree-induction analysis and will be described below.

It has also been determined that web breaks may be correlated with attributes that are outside of the control of the printer including, for example, attributes associated with the manufacture of the web 12. Generally speaking, each web is manufactured by a mill (which identifies the company that manufactured and distributed the web) at, typically, one of a number of mill sites associated with the mill. The mill site indicates the geographic location, e.g. city, of the particular plant in which the web 12 was made. Each mill site includes one or more web making machines (for example, paper making machines) that produces or generates large reels of material (e.g., paper) which may be, for example, 70 inches in diameter and 300 inches wide. Each web making machine may produce a multiplicity of reels of material (e.g., four) on any particular date. Each reel is logically divided into a number of reel sets (e.g., three) generally associated with different continuous portions of the material on the reel. For example, the first one-third of the material (when unrolled from the reel) may be the first reel set, the second one-third may be the second reel set and the last one-third may be the third reel set. To produce separate webs from the material on the reel, each reel set is unrolled from the reel, is cut along the length thereof to divide the width of the material into a number of log positions and the material at each log position of each reel set is rolled onto a smaller reel to produce the web reels that are delivered to customers, such as printers. Typically, the first log position of each reel set is designated as the "A" log position, the second log position is designated as the "B" log position and so on. However, generally, the last log position is designated as the "Z" log position no matter how many log positions there actually are in the reel set. Of course, each reel set may be cut into any desired number of log positions to produce webs of any desired width. Furthermore, while being unrolled, the material at each of the log positions of each reel set may be processed by other particularly identified auxiliary machines, such as a coater, a cutter, a winder, a supercolander, etc., each of which is uniquely identified with, for example, an identification number.

Thus, as will be understood from the above, each, for example, paper web used by a printing system has a mill site, a paper making machine, a manufacturing date, a reel set, a log position and particularly identified auxiliary paper machines associated with the manufacture thereof. Furthermore, each web has a tensile strength, a moisture content and a coefficient of friction associated therewith which are determined by the particular manufacturing processes and machines used. In particular, the coefficient of friction indicates the friction between adjacent layers of the web as the web is unrolled from a reel. The tensile strength, the moisture content and the coefficient of friction of each web may be measured by the web manufacturer or by the web purchaser in any desired manner.

Generally speaking, any one or more of these web manufacturing attributes may be correlated with the occurrence of web breaks or other problems in the web during printing thereon. For example, one of the web manufacturing machines or one of the auxiliary paper machines may have a fault therein that creates weakness in a web at certain locations. These weaknesses, which may be otherwise undetectable, may lead to web breaks during printing. Likewise, a particular web moisture content may lead to web breaks under some conditions that would not otherwise result in web breaks. Of course these or other web manufacturing attributes may be correlated with web breaks (or other problems) for any number of other reasons.

It has been determined, therefore, that it is advantageous to collect data pertaining to web manufacturing attributes during a plurality of printing runs in which web breaks occur and do not occur and, thereafter, to run a correlation analysis, such as an expert system analysis or other type of analysis, on that data to determine if any of the web manufacturing attributes are correlated with web breaks or other problems within the printing system. In this manner, web manufacturing attributes may be useful in identifying conditions under which web breaks are more likely to occur in a printing system.

In one embodiment, a database is used to store data associated with one or more of the mill site, the web manufacturing machine, the date, the reel number, the reel set, the log position, the auxiliary manufacturing equipment, the tensile strength, the moisture content and/or the coefficient of friction of each web used in a plurality of printing runs along with an indication of whether a web break (and/or other problem) occurred during each of the plurality of printing runs. Typically, some or all of this web manufacturing information is encoded on each web or roll of paper provided from a paper manufacturer in the form of a bar code number. To obtain this information, it may be necessary to scan the bar code of each web provided by a web manufacturer and to decode that bar code number according to the proprietary numbering or identifying scheme used by the web manufacturer. Any general or standard bar code reading and decoding software or circuitry may be used to perform this function as long as the numbering or identifying scheme of the web manufacturer is known. However, the web manufacturing attribute data may be determined in any other manner including, for example, by being supplied directly from the web manufacturer.

After the web manufacturing attribute data is collected for a plurality of printing runs (e.g., one printing run for each web) and an indication of whether those runs resulted in a web break or no web break is determined, any standard correlation analysis (such as a neural network analysis, an expert system analysis, a fuzzy logic analysis, etc.) may be applied to the stored data to determine if there is a correlation between any one or more of the web manufacturing attributes and the occurrence of web breaks or other problems within the printing system.

Of course, if desired, the correlation analysis may be performed using both web manufacturing attribute data and printing attribute data, such as the web tension data discussed above, to determine if a correlation between any combination of these attributes results in an increased or decreased occurrence of web breaks. Of course, when a particular correlation between one or a combination of two or more attributes (which may be both printing and web manufacturing attributes) is identified, this correlation may be displayed via a printer, a monitor, or other display device and may be used to control the printing system to avoid occurrence of web breaks. Furthermore, when a correlation between one or more web manufacturing attributes and web breaks (or other problems) is identified, a web manufacturer may be notified that there may be a problem in, for example, a particular web manufacturing machine or auxiliary machine because there is an increased occurrence of web breaks in the webs manufactured or processed by that machine. In such a case, the web manufacturer may perform a detailed analysis of the suspect machine or process to determine if a heretofore undetected problem exists and then fix the machine or change the process when a problem is detected.

A preferred method and device for analyzing collected data pertaining to either or both of web manufacturing attributes and printing attributes (particularly web tensions) to identify correlations between one (or a combination of two or more) of these attributes and web breaks (or other problems) is discussed hereinafter. Generally, a preferred correlation analysis uses an expert system and, particularly, a decision-tree induction analysis to determine the correlation between any one or more web manufacturing and/or printing attributes and the occurrence of web breaks. Likewise, this same decision-tree induction analysis can be used to determine web tension ratio ranges that result in the decrease of web breaks during printing runs of a printing system.

Figure 2:
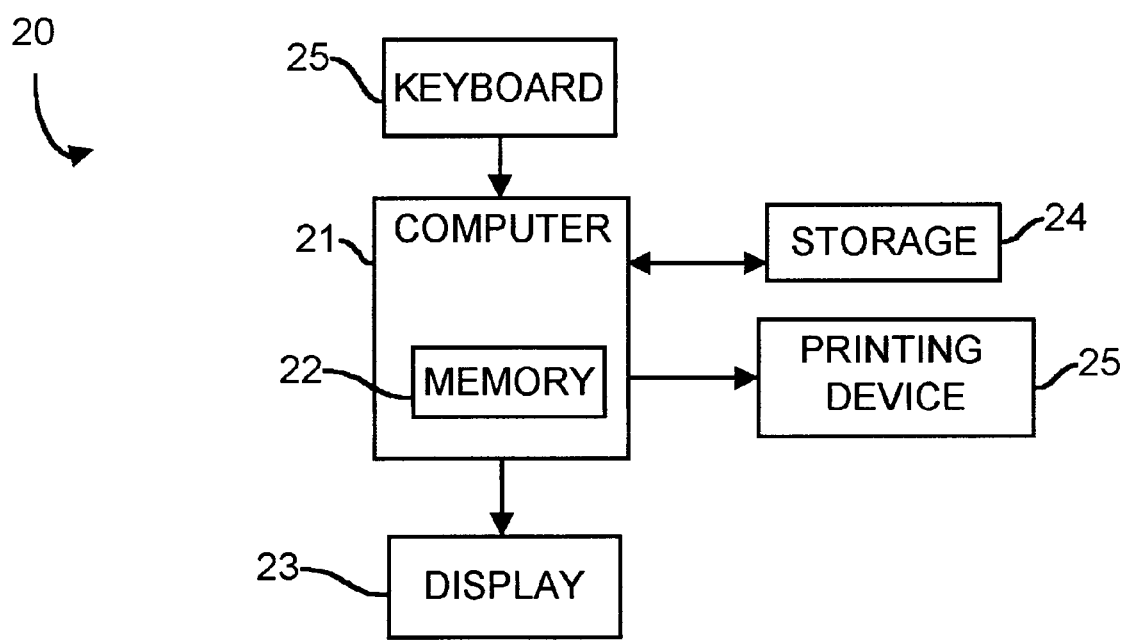
FIG. 2 is a block diagram of a system for use in building an induction tree according to the present invention.

Referring now to FIG. 2, a system 20 that constructs induction trees for the purpose of identifying conditions leading to a particular result (e.g., web breaks) in a multi-variant system includes a computer 21 (which may be any type of processor) having a memory 22 therein. The computer 21, which may be integral with or a part of the controller 17 of FIG. 1, is connected to a display device 23 (such as a CRT) and to a data storage device 24 which stores data used by the computer 21. An input device, such as a keyboard 25, allows a user to enter data and otherwise interact with the computer 21. If desired, the storage device 24 may comprise a disk drive that alternatively or additionally allows a user to input data into the computer 21. A printing device 26 is attached to the computer 21 and is capable of printing induction trees developed by the computer 21 and/or other information, such as alarms, generated by the computer 21. Other input/output devices might alternatively or additionally be used.

Figure 3A:
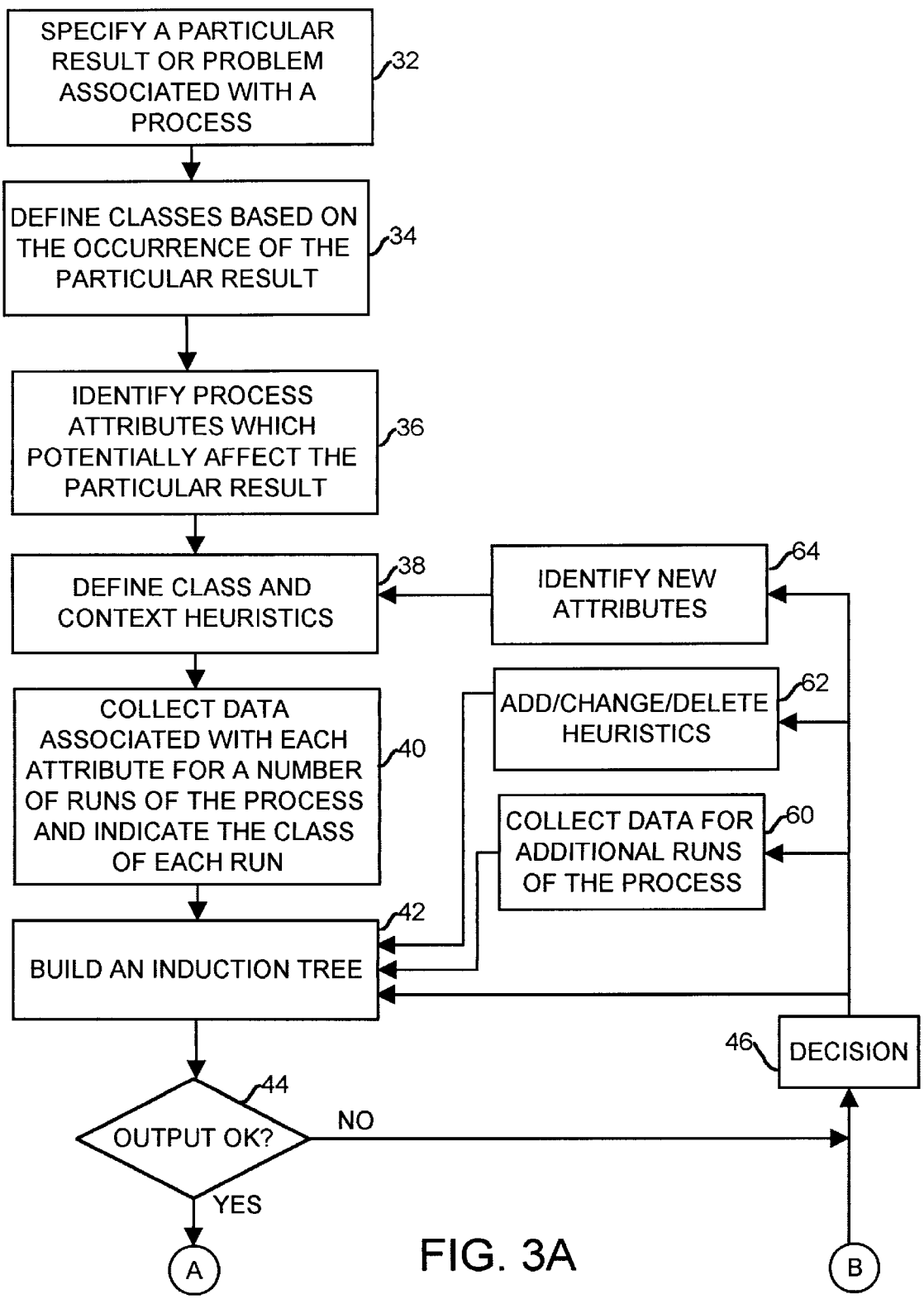
FIGS. 3A and 3B, when joined along similarly lettered lines, together form a flowchart of steps undertaken during a method of identifying conditions leading to a web break according to the present invention.
Figure 3B:
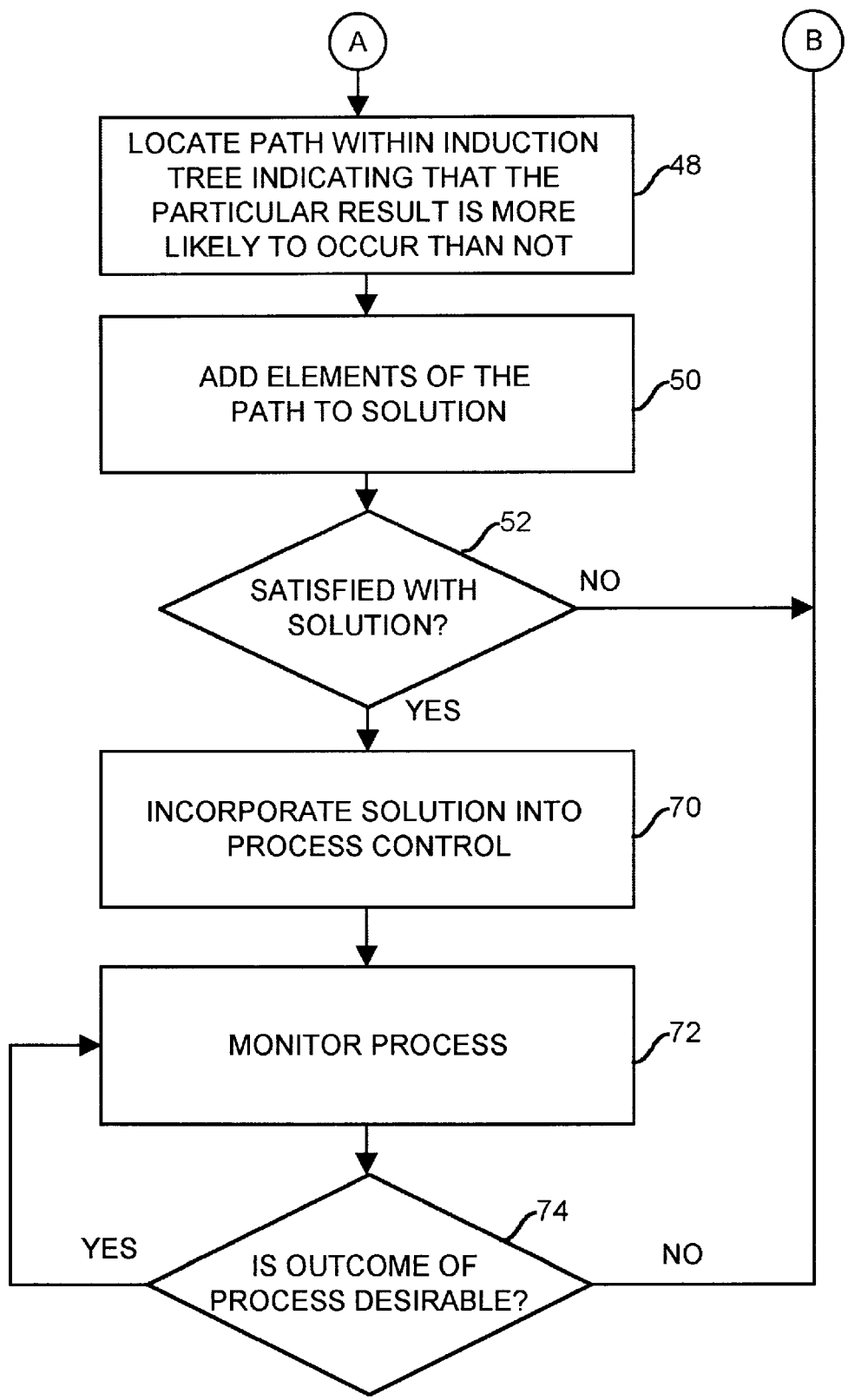

Referring now to FIGS. 3A and 3B, a flowchart illustrates a method that may be implemented in part by programming executed by the computer 21 (FIG. 2) that identifies conditions leading to a particular result, such as web breaks, in a printing system, that identifies web tension ratio ranges associated with the decreased occurrence of web breaks in a printing system and/or that prescribes and implements a solution that decreases the probability of occurrence of, for example, web breaks in a printing system. Although the particular result described hereinafter (e.g., a web break) comprises an undesirable outcome of a process and the method is used to decrease the occurrence of the particular result, the particular result could instead comprise a desirable outcome or other desirable effect associated with the process (e.g., no web break) and the method could be used to increase the probability that the particular result will occur.

At the start of the method (step 32), a domain expert who is knowledgeable about a process specifies a particular result (such as a web break) associated with the process (e.g., a printing system). At a step 34, the domain expert defines classes associated with the particular result. Typically, the nonoccurrence of the particular result is associated with a first class and the occurrence of the particular result is associated with a second class.

At a step 36, the domain expert identifies attributes or features of the process that are potentially relevant to the occurrence of the particular result of the process. These attributes can be continuous, e.g., real valued, or discrete. If an attribute is discrete, the domain expert must identify the discrete values or categories that a value of the attribute can assume. As noted above, for the case of web breaks, these attributes may include web manufacturing attributes, such as a mill site, a web making machine, a manufacturing date, a reel number, a reel set, a log position, one or more auxiliary web machines, a web tensile strength, a web moisture content and/or a coefficient of friction as well as printing attributes such as web tensions (e.g., reel tension, infeed tension, drag tension and ribbon tension) and web tension ratios (e.g., infeed tension to reel tension, drag tension to infeed tension, ribbon tension to drag tension, etc.) of course, other web manufacturing attributes and/or printing attributes may be used as well including, for example, ambient printing room conditions such as humidity, temperature, etc.

In order for the method to be ultimately successful in determining the cause of the particular result (such as a web break) or in prescribing a solution that increases or decreases the probability of the occurrence of the particular result, it is important that all of the attributes that are actually relevant to the particular result be identified. If attributes that are actually relevant to the particular result are not identified at the step 36, the method may fail to determine the cause of the particular result or may produce an incomplete or inaccurate solution. However, identifying attributes that are not actually relevant to the occurrence of the particular result will not degrade the performance of the method or the solution ultimately obtained thereby.

At a step 38, the domain expert may identify class and context heuristics or rules associated with the attributes identified at the step 36. A class heuristic represents a known relationship between the distribution of classes and specific portions of the range of an attribute. A class heuristic preferably specifies that a particular range of an attribute should include a higher or lower proportion of attribute values that are associated with a particular one of the classes than any other range of the attribute. Class heuristics are used to prevent the method from searching for induction rules that are already known to be inaccurate in connection with the domain or the process.

A context heuristic represents an order of priority between two or more attributes. A context heuristic may, for example, specify that it is meaningless to search for induction rules associated with one of the identified attributes before searching for induction rules associated with a different one of the attributes. Thus, it may not make sense to search for an induction rule associated with a paper manufacturing machine before searching for one associated with a mill site. The attribute with the lower priority is said to be inactive within the context heuristics until the method has examined the attribute with the higher priority.

At a step 40, data or values are collected for each of the attributes for each of a number of runs of the process. This data may include values for the web manufacturing and web tension attributes identified above. A plurality of data records are then created, each of which includes values for the attributes identified at the step 36 along with the class associated with a particular run of the process. The plurality of records comprises a database that is used to develop induction rules associated with the process and that is stored within, for example, the storage device 24 of FIG. 2, preferably in text format. It is important that the values for the attributes are measured accurately. Inaccurate and/or incomplete data may lead to an inaccurate determination of the cause of the particular result or may lead to an inaccurate solution for increasing or decreasing the probability of the occurrence of the particular result. As a result, data preprocessing that, for example, replaces outliers (clearly inaccurate data), fills in missing data, eliminates records having incorrect or missing data, etc. may be performed to purify the data.

At a step 42, the records created at the step 40 are used to construct an induction tree. Preferably, at the step 42, the domain expert is allowed to guide the construction of the induction tree interactively. Each induction tree created at the step 42 indicates relationships between values of the attributes and the classes identified for the process (e.g., whether a web break or no web break occurred). An indication of the induction tree may be provided to a user via, for example, the printing device 25 or the display device 23 of FIG. 2.

At a step 44, the domain expert reviews the induction tree to determine whether the induction tree is satisfactory, i.e., whether any potentially relevant induction rules may be suggested thereby. If the induction tree is not satisfactory because, for example, no induction rules can be identified or the induction rules that are identified are not implementable in the process due to economic, social, quality or other reasons, the method proceeds to a decision step 46.

However, if the induction tree is satisfactory, the method proceeds to a step 48 of FIG. 3B at which the domain expert locates one or more paths within the induction tree that indicate that the particular result is more likely to occur than not. Conversely or in addition, the domain expert may also locate one or more paths within the induction tree that indicate that the particular result is less likely to occur than not. Each path identified by the expert may comprise one or more attribute values or ranges of attribute values associated with runs of the process that fall exclusively or almost exclusively into one of the classes defined at the step 34. Any particular induction tree may suggest any number of paths that lead to one or more components of a solution which, when used to control the process, will affect the probability of the occurrence of the particular result.

Rather than identifying induction rules manually by identifying such paths, the identification of induction rules can be performed automatically. A book written by J. R. Quinlan, C4.5: Programs for Machine Learning (1991), (in particular, chapters 5 and 9 and the appendix thereof), discloses a technique that automatically searches for and identifies induction rules within an induction tree. At a step 50, the components of the paths identified at the step 48 are added to a solution list, which may be stored in the memory 22 or the storage device 24 associated with the computer 21 of FIG. 2. Typically, different paths of either the same or different induction trees may identify different ranges of the same attribute as one of the solution components. If these ranges are not mutually exclusive, and where it is practical to do so, the domain expert preferably adopts the range included in all of the paths as the ultimate solution component.

At a step 52, the domain expert determines whether the solution as compiled in the solution list is satisfactory. If the domain expert believes that the solution is not complete, the method proceeds to the decision step 46 of FIG. 3A.

At the step 46, the domain expert chooses one of a number of options in order to improve the quality of the induction tree constructed at the step 42 and to enhance the solution compiled at the step 50. Following the step 46, a new induction tree may be built at the step 42 with further input from the domain expert.

Alternatively, at the step 46, the method may proceed to a step 60 at which data is collected for additional runs of the process. The resulting additional records are added to the database used at the step 42 to build an induction tree. In this manner, a more complete or informative induction tree can be constructed at the step 42.

Also, at the step 46, the method may proceed to a step 62 wherein the domain expert changes, adds and/or deletes one or more of the class and/or context heuristics previously identified for the domain. This step is particularly useful when an induction tree indicates that the class heuristics previously identified are incorrect.

Alternatively, at the step 46, the method may proceed to a step 64 wherein the domain expert identifies additional attributes that may be relevant to the occurrence of the particular result but that were not previously identified. This step is particularly useful when the induction tree developed at the step 42 does not present any clear results. At the step 64, the domain expert can also delete attributes from the set of attributes previously identified when, for example, the expert believes that those attributes are not, in fact, relevant to the particular result. If at least one new attribute is identified at the step 64, the method returns to the step 38 at which class and context heuristics for the new or already identified attributes are defined. At the step 40, data for a new plurality of runs of the process are collected to produce records having data for all of the attributes, including the newly identified attribute(s).

When, at the step 52 of FIG. 3B, the expert is satisfied with the solution obtained at the step 50, the solution is incorporated into the process by running the process at a step 70 so that the process attributes have values within the ranges specified by the solution. For example, the tensions within the printing system 5 of FIG. 1 may be controlled to keep the ratio of these tensions at a tension ratio value or within a tension ratio range determined to be associated with a reduced occurrence of web breaks. At a step 72, the process is monitored during subsequent runs thereof and a determination is made at a step 74 whether the solution has been adequate in achieving a desired outcome, that is, eliminating or reducing the particular result (e.g., web breaks) from the process in an acceptable manner.

If the outcome of the process is desirable, the method returns to the step 72 which continues to monitor the outcome of the process. If, however, the outcome of the process is not desirable or if the outcome of the process returns to an undesirable condition during further monitoring of the process, the method returns to the step 46 of FIG. 3A at which the expert builds a new induction tree, collects additional data for the identified attributes, changes heuristics or identifies new attributes, all in an effort to generate a more complete or accurate solution, that is, to identify better web tension ratio values or ranges and/or to identify other correlations between web manufacturing attributes and web breaks or other web problems.

Generally, the induction tree constructed at the step 42 has a root and any number of nodes that branch from either the root or from another node of the induction tree. The induction tree is constructed iteratively and performs the same operations at the root and each node using only data contained in records that are in a "current" database that has a content that varies with the position in the induction tree. At the root of the induction tree, the current database includes all of the records produced at the steps 40 and 60. The current database associated with any particular node of the induction tree includes a subset of the records of the database associated with the node (or root) from which the particular node branches.

Figure 4:
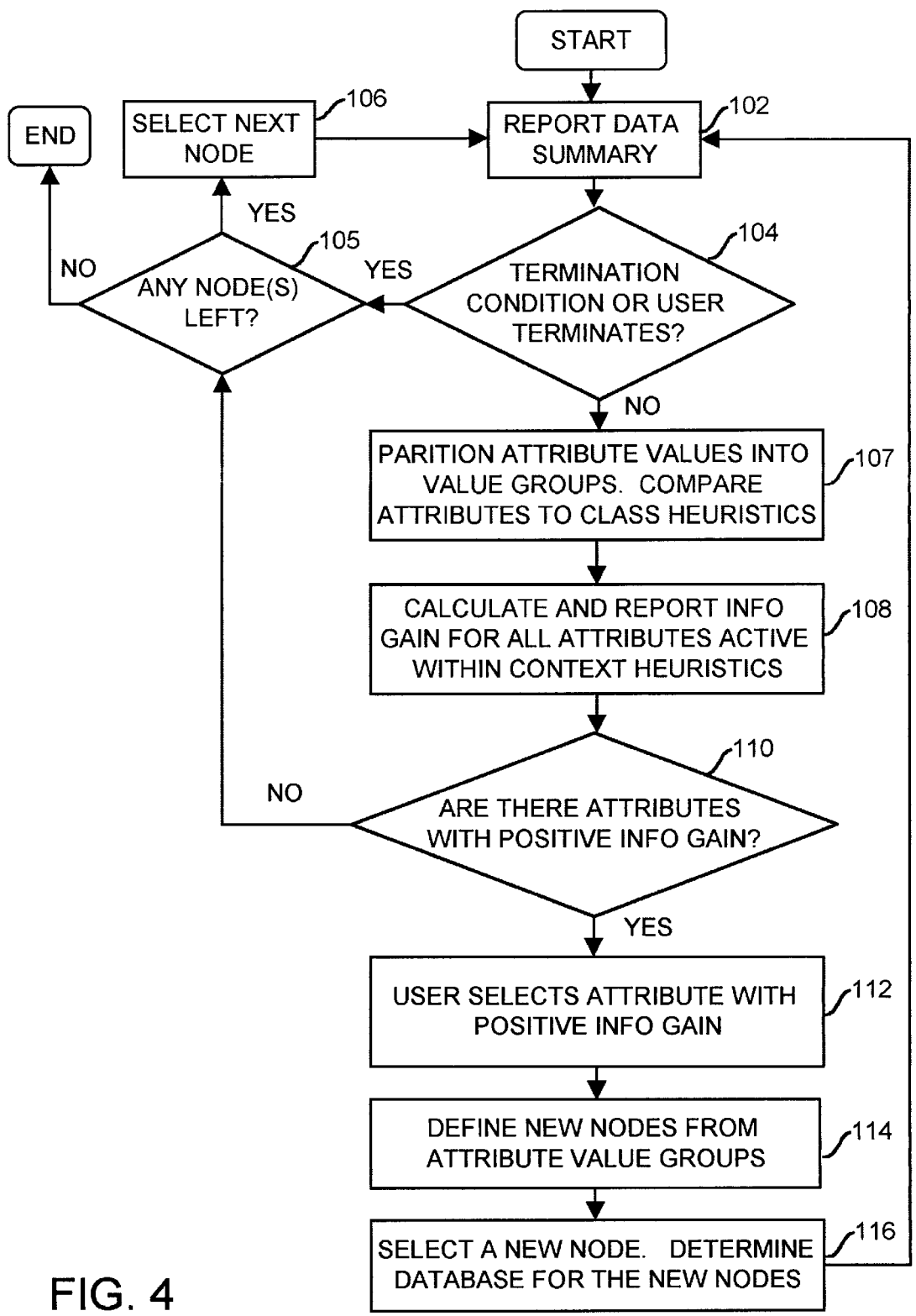
FIG. 4 is a flowchart of programming executed by the system of FIG. 2 for implementing a portion of the method identified by the flowchart of FIGS. 3A and 3B.

FIG. 4 illustrates a flowchart of programming, preferably in LISP (a commercially available programming language particularly suited for artificial intelligence applications), that is executed by the computer 21 to implement the step 42 of FIG. 3A. The programming begins at a block 102 which reports a summary of the records within the current database to the user via, for example, the display 23 of FIG. 2. Preferably, this summary indicates the number of records within the current database that are associated with each of the classes identified at the step 34 of FIG. 3A. The summary also identifies whether all of the records within the current database have the same value for any particular attribute and provides a characterization list that identifies the attributes for which that condition is satisfied. The summary may also list the values of one or more attributes and indicate the classes of the records having these values to provide the expert with more information about the records within the current database.

A block 104 then determines if a node termination condition is present. Preferably, a node termination condition exists if at least a predetermined percentage of the records within the current database are associated with the same class, in which case the node is labeled as an endpoint or a leaf of the induction tree. A node termination condition may also exist if all of the attributes active within the context heuristics have been selected as a branch within a path from the node to the root of the tree. Alternatively, a user can manually terminate the node using, for example, the keyboard 25 of FIG. 2 or another input device.

If a node termination condition exists, the block 104 terminates branching from the node and a block 105 determines if any unexamined nodes remain. If no unexamined nodes remain, the induction tree is complete and the program ends. If, however, all of the nodes have not been examined, a block 106 locates the next node, updates the current database to be that associated with the next node and returns control to the block 102. Alternatively, the block 106 can allow a user to select the next node to examine.

If the block 104 does not find a termination condition, a block 107 places each of the attributes in the characterization list into a context set identified for that node. The context set at each node is used to determine if an attribute is active within the context heuristics. The context set for a particular node (other than the root) includes: (1) the context set for the node from which the particular node branched (this node hereinafter referred to as the "previous node"); (2) any attribute identified in the characterization list by the block 102 for the particular node; and (3) the attribute chosen as the branch from the previous node to the particular node. The context set for the root of the induction tree contains only those attributes identified in the characterization list at the root of the induction tree.

The block 107 then partitions each active attribute into a finite number of value groups. Discrete attributes are partitioned into value groups according to discrete categories associated therewith. Real valued or continuous attributes are partitioned into value groups based on the actual values of that attribute within the current database and the classes associated with those values, as described hereinafter with respect to FIGS. 5A and 5B. The block 107 may also determine whether the actual distribution of the classes among the value groups is consistent with the class heuristics defined for the attributes. If the block 107 discovers an inconsistency between the actual distribution of the classes among the value groups of an attribute and the distribution specified in the class heuristic, that attribute is marked with a disagreement flag.

Next, a block 108 calculates a figure of merit, such as the normalized information gain value for each of the attributes active within the context heuristics, using the value groups developed by the block 107. The information gain value of an attribute is a measure of the distribution of the classes across the value groups of the attribute. The information gain value is defined such that a value of "1" indicates a complete or "perfect" correlation between the attribute value groups and the classes. In such a case, each attribute value group contains instances of only one class or is an empty set and, hence, the value groups completely discriminate the classes. Information gain values between "0" and "1" indicate less than complete correlation between the value groups and the classes, i.e., there is some distribution of classes among the value groups of the attribute. Information gain values close to "1" indicate a high correlation between the attribute value groups and the classes and information gain values close to "0" indicate a low correlation between the attribute value groups and the classes. An information gain value of "0" indicates that no correlation between the attribute value groups and the classes exists and thus, that the classes are randomly distributed throughout the value groups of the attribute. In such a case, the distribution of the classes is not affected by the selection of the attribute and so, selection of the attribute at the node would not be particularly helpful.

Preferably, the information gain value IG (A) of an attribute A is calculated as follows:

$$IG(A) = I(p, n) - E(A) \qquad (1)$$

wherein $$I(p, n) = -\frac{p}{p+n}\log_2\frac{p}{p+n} - \frac{n}{p+n}\log_2\frac{n}{p+n} \qquad (2)$$

and $$E(A) = \text{Expected value of attribute } A \qquad (3)$$
$$= \sum_{i=1}^{vg} \frac{p_i + n_i}{p+n} \cdot I(p_i, n_i)$$

where:

p=Number of records within the current database associated with the first class; and n=Number of records within the current database associated with the second class;

and where:

vg=Total number of value groups associated with attribute A;

$p_i$=Number of records within the current database that are associated with the value group i of attribute A and that are associated with the first class;

$n_i$=Number of records within the current database that are associated with the value group i of attribute A and that are associated with the second class; and $I(p_i, n_i) = I(p, n)$ calculated for $p = p_i$ and $n = n_i$;

Although the information gain value IG (A) is useful, it is biased toward those attributes that have a greater total number of value groups. Thus, an attribute having two value groups each with an equal probability of having a particular class associated therewith will have an information gain value that is less than the information gain value of an attribute having six value groups each with an equal probability of having a particular class associated therewith. To correct this bias, the following normalizing information gain value NG(A) for attribute A is calculated by the block 108:

$$NG(A) = \frac{IG(A)}{NF(A)} \qquad (4)$$

where:

$$NF(A) = -\sum_{i=1}^{vg}\left[\frac{p_i}{p_i+n_i}\log_2\frac{p_i}{p_i+n_i} + \frac{n_i}{p_i+n_i}\log_2\frac{n_i}{p_i+n_i}\right] \qquad (5)$$

Next, a block 110 determines if any of the attributes active within the context heuristics have positive normalized information gain values. If none of the attributes has a positive normalized information gain value, the block 110 terminates further branching from the node and control passes to the blocks 105 and 106 which select the next node to be examined. If, however, one or more of the attributes have a positive normalized information gain value, a block 112 presents each of the attributes active within the context heuristics and the normalized information gain value associated therewith to the expert via the display 23 of FIG. 2.

Preferably, the attributes are ranked according to the normalized information gain values associated therewith. Such ranking may include the categories of: BEST, for the attribute having the highest normalized information gain value; HIGHLY USEFUL, for attributes having a normalized information gain value at least 95 percent of the highest normalized information gain value; USEFUL, for attributes having a normalized information gain value between 90 and 95 percent of the highest normalized information gain value; MARGINAL, for attributes having a normalized information gain value between 75 and 90 percent of the highest normalized information gain value; QUESTIONABLE, for attributes having a normalized information gain value between 50 and 75 percent of the highest normalized information gain value; LAST RESORT, for attributes having a normalized information gain value above zero but below 50 percent of the highest normalized information gain value; and USELESS, for attributes having a normalized information gain value of substantially zero. Any other desired categories can be alternatively or additionally used.

Preferably, any attribute that has been marked by the block 107 as having a distribution of classes among its value groups that is inconsistent with a class heuristic is identified as such by, for example, placing brackets around the displayed normalized information gain value of that attribute. Alternatively, the normalized information gain value of any such attribute can be set to zero.

The block 112 then permits selection of one of the attributes as a branch within the induction tree. Preferably, the block 112 allows the domain expert to interactively select one of the attributes that, also preferably, has a positive normalized information gain value. It is important to note, however, that the expert need not select the attribute having the highest normalized information gain value, but can select any of the attributes active within the context heuristics according to any desired criteria. Alternatively, the block 112 can automatically select one of the attributes and, in such a case, preferably selects the attribute with the highest normalized information gain value. However, automatic selection of an attribute may lead to a less complete or desirable solution.

A block 114 causes branching on the chosen attribute such that new nodes are created within the induction tree, each of which corresponds to a value group of the chosen attribute. A block 116 permits a user to interactively terminate or to select each of the new nodes for examination, defines a new current database for each selected node and places the selected attribute into the context set for that node. The new current database includes all of the records within the database of the previous node having values associated with the value group of the new node. When one of the nodes has been selected, the block 116 stores an indication of the other nodes that were created by the block 114 and an indication of the databases and the context sets associated with those nodes for future examination in, for example, the data storage unit 24 of FIG. 2. The block 116 then returns to the block 102 which begins an iteration for the new node.

Figure 5A:
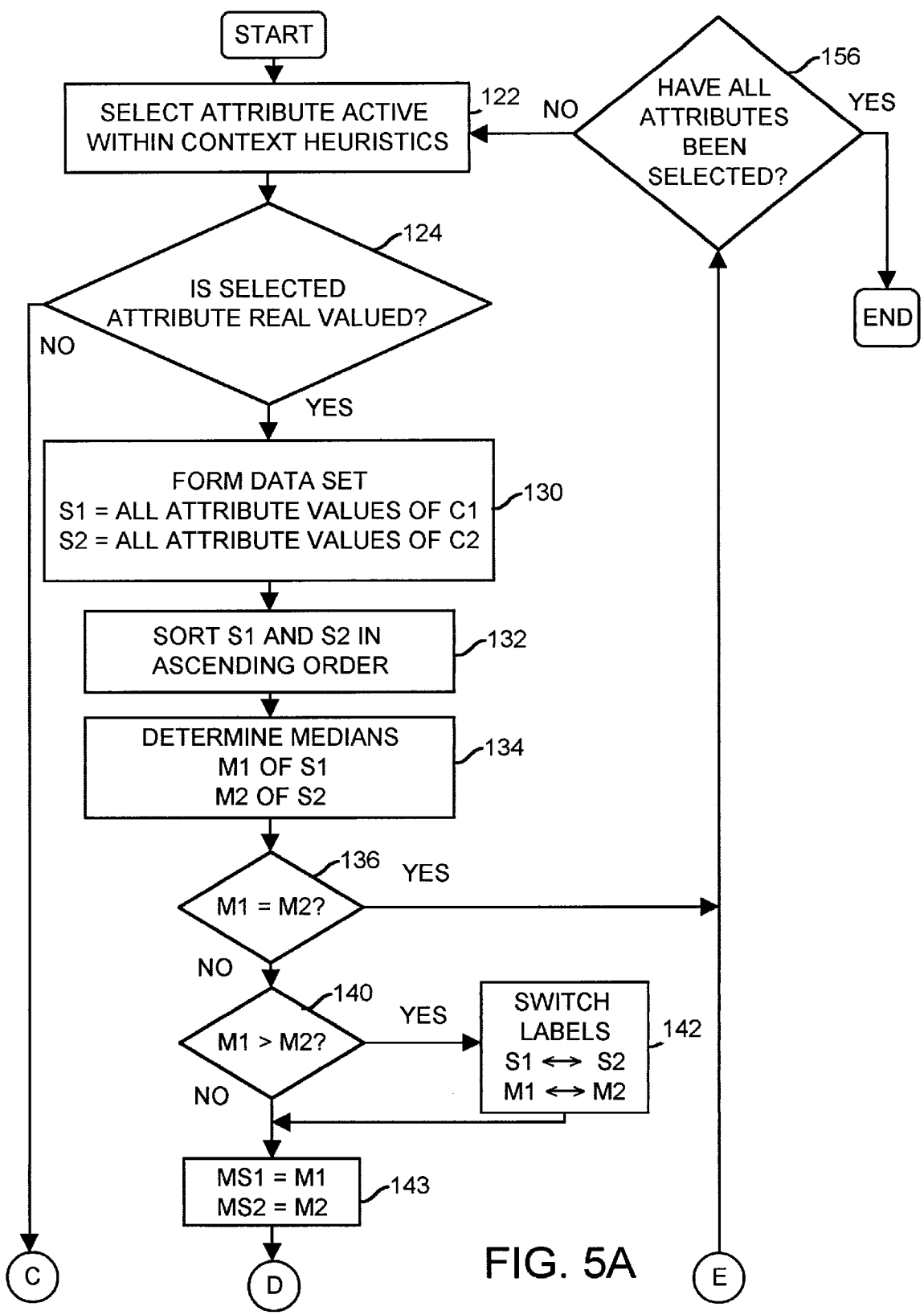
FIGS. 5A and 5B, when joined along similarly lettered lines, together form a flowchart of programming for implementing a block of FIG. 4.
Figure 5B:
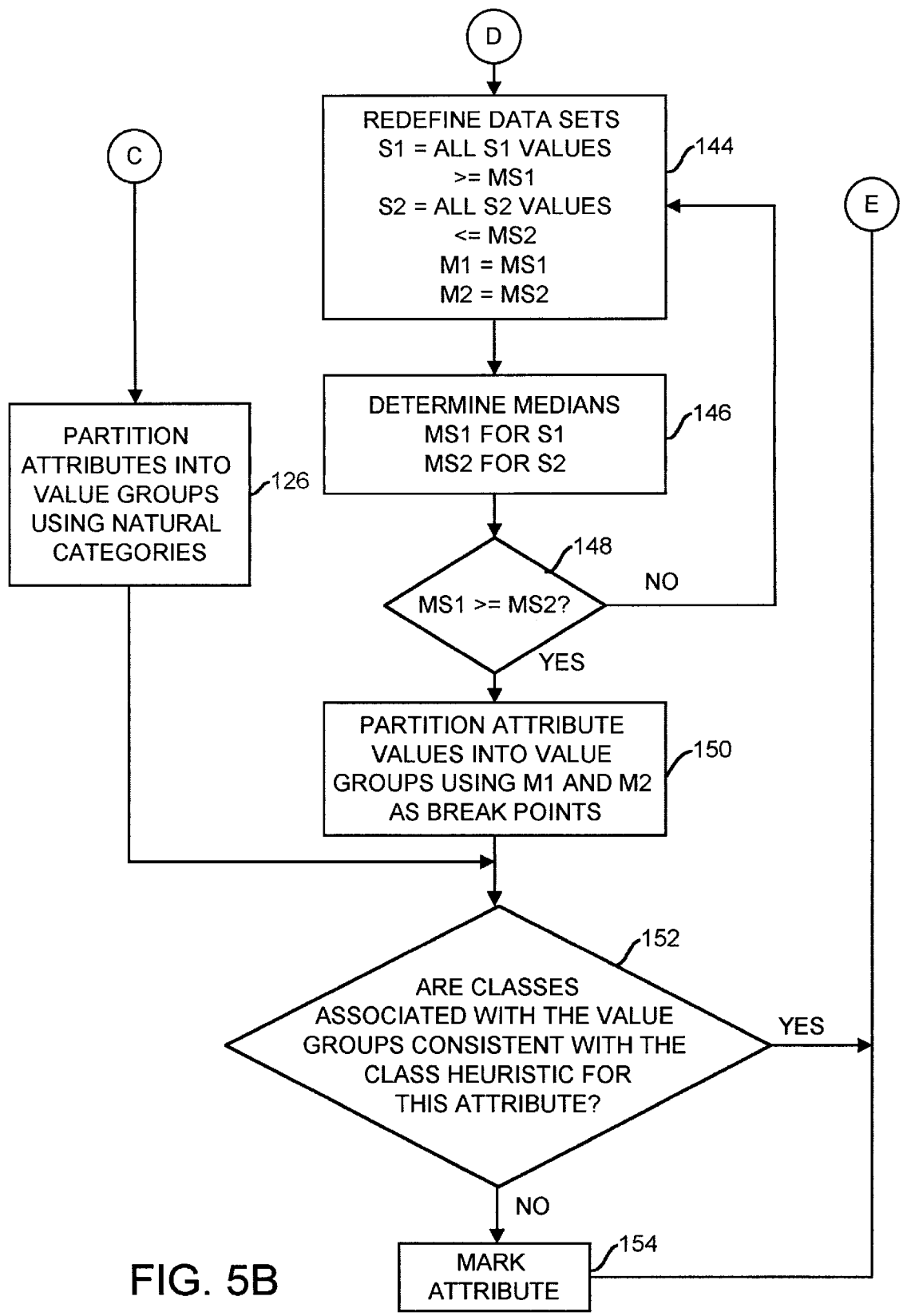

Referring now to FIGS. 5A and 5B, the operation of the block 107 of FIG. 4 will be described in detail. A block 122 selects a present attribute and determines whether the present attribute is active within the context heuristics. In doing so, the block 122 compares the context set for the node with a context list associated with the present attribute. The context list associated with the present attribute identifies those attributes that must be branched upon in the induction tree before the present attribute can become active. If all of the attributes within the context list associated with the present attribute are also within the context set of the node being examined, the present attribute is deemed to be active. If the present attribute has an empty context list it is always active within the context heuristics.

A block 124 then determines if the present attribute is real valued. If not, then the present attribute is a discrete valued attribute and a block 126 of FIG. 5B partitions the present attribute into value groups based on the categories associated with the present attribute that have been previously defined by the domain expert.

If the block 124 determines that the present attribute is real valued, a block 130 forms two data sets S1 and S2 from the values of the present attribute. The data set S1 includes all of the values of the present attribute in records within the current database associated the first class. The data set S2 includes all of the values of the present attribute in records within the current database associated with the second class.

A block 132 sorts all of the values within each of the data sets S1 and S2 in ascending order and a block 134 determines the medians M1 and M2 for the data sets S1 and S2, respectively. A block 136 determines whether the medians M1 and M2 are equal and, if so, the present attribute cannot be partitioned. Control is then passed to a block 156 and, as a result, the present attribute will only have one value group and the normalized information gain value associated therewith will be zero.

If, on the other hand, the medians M1 and M2 are not equal to one another, a block 140 tests to determine if the median M1 is greater than the median M2. If so, a block 142 relabels the data set S1 as data set S2 and the median M1 as median M2 and, simultaneously, relabels the data set S2 as data set S1 and the median M2 as median M1. Furthermore, the block 142 stores a class flag that indicates that the data sets S1 and S2 have been relabeled.

Next, a block 143 sets median values MS1 and MS2 equal to medians M1 and M2, respectively. A block 144 of FIG. 5B redefines the data set S1 to include only the values within the data set S1 that are greater than or equal to the median MS1. The block 144 also redefines the data set S2 to include only the values within the data set S2 which are less than or equal to the median MS2. Furthermore, the block 144 sets the medians M1 and M2 equal to the medians MS1 and MS2, respectively. A block 146 then determines the medians MS1 and MS2 of the new data sets S1 and S2, respectively. Next, a block 148 determines whether the median MS1 is greater than or equal to the median MS2 and, if not, control returns to the block 144 which redefines the data sets S1 and S2.

The blocks 144, 146 and 148 are re-executed until the block 148 determines that the median MS1 is greater than or equal to the median MS2. When this condition occurs, a block 150 partitions the selected real valued attribute into three value groups. The first value group includes all of those attribute values associated with records within the current database that are less than or equal to M1. The second value group includes all of those attribute values associated with records within the current database that are greater than M1 and less than M2. The third value group includes all of those attribute values associated with records within the current database that are greater than or equal to M2. If desired, additional value groups can be defined by ranges at the upper and/or lower ends of the attribute value continuum that are associated exclusively with one class.

Although the blocks 134 and 146 are described herein as determining the medians of the sets S1 and S2, any other desired statistical properties of the sets S1 and S2, including the means thereof, could instead be determined and used in the method illustrated in the flowchart of FIGS. 5A and 5B. It should be noted that the above-described method of partitioning real valued attributes is computationally simple and inexpensive and, therefore, can be applied at every node of the induction tree that is labeled as a branching point.

A block 152 determines whether the distribution of the classes among the value groups developed by the blocks 126 and 150 is consistent with any class heuristics previously identified at the steps 38 or 62 of FIG. 3A. For real valued attributes, it is assumed that the first class is associated with the data set S1, meaning that proportionately more of the values within the data set S1 are associated with the first class than are associated with the second class. Likewise it is assumed that the second class is associated with the data set S2 such that proportionately more of the values within the data set S2 are associated with the second class than are associated with the first class. If, however, the class flag indicates that the data sets S1 and S2 have been relabeled during the discretization process, it is assumed that the first class is associated with the data set S2 and that the second class is associated with the data set S1.

With respect to real valued attributes, the block 152 determines if the class associated with the data set S1 or S2, as defined by the class flag, is consistent with the class heuristic. If so, the distribution of classes is said to be consistent with the class heuristic wherein the latter indicates whether higher or lower values of an attribute are expected to be associated with one of the classes. A class associated with the data set S1 is consistent with a class heuristic that indicates that lower values of the attribute are more likely to be associated with the class than higher values. Likewise a class associated with the data set S2 is consistent with a class heuristic that indicates that higher values of the attribute are more likely to be associated with the class than lower values of the attribute.

Preferably, for discrete valued attributes, a class heuristic indicates a value or a value group of the attribute and the class that should be predominantly associated with that value group. Thus, for discrete valued attributes, the block 152 determines whether there is a higher or lower percentage of a class within the value group defined by the class heuristic than the percentage of that class in any other range of the attribute. For example, if the class heuristic identifies that one value group is more likely to be associated with the first class, the block 152 compares the percentage of values in the one value group that are associated with the first class to the percentage of the values of that attribute associated with the first class in each of the other value groups. If the percentage of values associated with the first class is highest in the one value group, the distribution of classes among the value groups is consistent with the class heuristic.

If the block 152 determines that the distribution of classes predominantly associated with the value groups of the attribute is inconsistent with the class heuristic identified for the attribute, a block 154 marks the attribute with a disagreement flag.

After the attribute has been marked by the block 154 or, if the block 152 does not detect an inconsistency between the distribution of the classes of the values within the value groups of the attribute and a class heuristic defined for the attribute, the block 156 of FIG. 5A determines if all of the attributes that are active within the context heuristics have been selected. If so, the method proceeds to the block 108 of FIG. 4. Otherwise, the block 122 selects the next attribute for partitioning.

Figure 6:
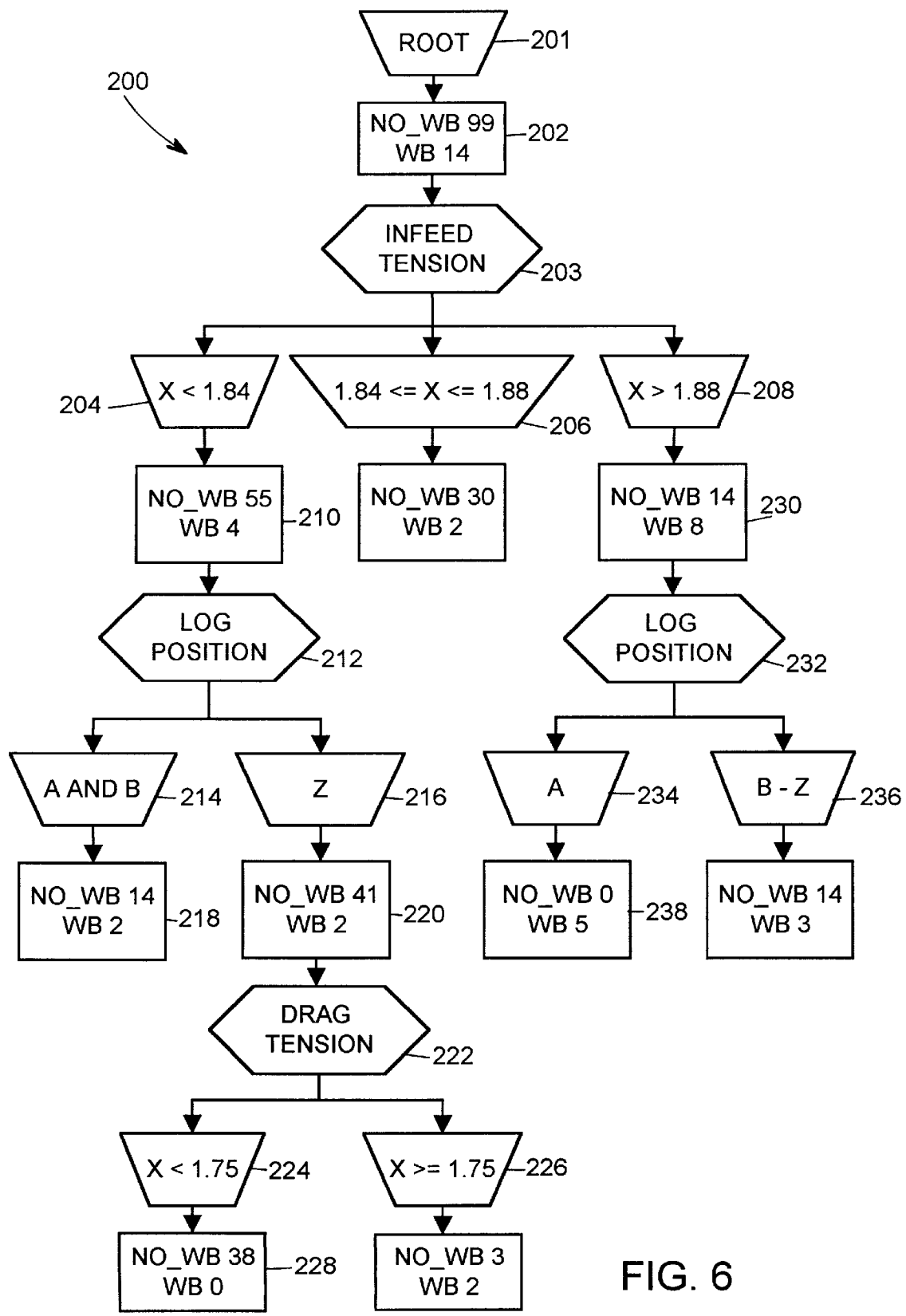
FIG. 6 is an induction tree constructed according to the present invention for identifying conditions leading to web breaks in a rotogravure printing process.

Referring now to FIG. 6, an example induction tree 200 illustrating the operation of the above-described decision-tree induction method for the case in which data has been collected and stored for printing attributes and web manufacturing attributes is shown. In particular, the induction tree 200 was created using, among others, web tension attribute data (infeed tension and drag tension) and web manufacturing attribute data (log position). The induction tree 200 includes a root 201 and a summary box 202 that indicates that of the 113 records within the current database at the root 201, 99 of the records are associated with the no web break (NO-WB) class while 14 of the records are associated with the web break (WB) class. At the time that the induction tree 200 was constructed, the normalized information gain values were computed for each attribute active within the context heuristics and the user was presented with a list of the attributes active within the context heuristics and the normalized information gain values associated therewith. In the case shown in FIG. 6, the user chose the attribute Infeed Tension as a first branch 203 of the induction tree 200. The attribute Infeed Tension is real valued and was separated into three ranges (identified as nodes 204, 206 and 208) using the real valued discretizing routine described above with respect to FIGS. 5A and 5B. As illustrated in FIG. 6, the node 204 is associated with the infeed tension range of less than 1.84 PLI, the node 206 is associated with the infeed tension range of less than or equal to 1.88 PLI and greater than or equal to 1.84 PLI and the node 208 is associated with the infeed tension range of greater than 1.88 PLI.

At the node 204, the current database included 59 records, comprising the records within the database at the root 201 having an Infeed Tension value less than 1.84 PLI. A summary block 210 indicates that 55 of these records were associated with the NO WB class and that 4 of these records were associated with the WB class.

Following the node 204, the attribute Log Position was selected as a branch 212. The attribute Log Position was divided into two discrete value groups which are identified as nodes 214 and 216. The node 214 is associated with the "A" and "B" log positions of web material as manufactured on a particular printing machine at a particular mill site, while the node 216 is associated with the "Z" or last log position of the web material associated with that same printing machine. As illustrated by the summary block 218, the "A" and "B" log positions had 14 records associated with the NO_WB class and 2 records associated with the WB class. Likewise, as illustrated by the summary block 220, the "Z" log position had 41 records associated with the NO_WB class and 2 records associated with the WB class.

Under the "Z" log position node 216, Drag Tension was selected as a branch 222. Two drag tensions ranges, specifically, less than 1.75 PLI (node 224) and greater than or equal to 1.75 PLI (node 226) were identified for the drag tension attribute. As indicated by the summary block 228, there were 38 records associated with the NO_WB class and zero records associated with the WB class for the node 224, which makes the node 224 an endpoint of the induction tree 200. The endpoint 224 indicates that using infeed tension below 1.84 PLI and drag tension below 1.75 results in the avoidance of web breaks. Of course, this observation also suggests that using a drag tension to infeed tension ratio of approximately 1.75 over 1.84 or 0.95 is likely to decrease the incidence of web breaks in the printing system for which the data was collected.

Under the node 208, which has 14 records associated with the NO_WB class and 8 records associated with the WB class (summary block 230), the log position attribute was again chosen as a branch 232. For the sake of illustration, the log position attribute was broken into two separate nodes 234 and 236, wherein the node 234 is associated with the "A" log position and the node 236 is associated with the rest of the log positions "B" through "Z". As illustrated by the summary block 238, the "A" log position includes zero records associated with the NO_WB class and 5 records associated with the WB class and is, therefore, an endpoint of the induction tree 200. The endpoint 234 suggests that there is a strong correlation between the "A" log position and web breaks, especially at infeed tensions greater than 1.88 PLI.

Thus, based on the induction tree 200, it may be seen that a drag tension to infeed tension ratio of approximately (i.e., within the range of) 0.95 is appropriate for reducing the occurrence of web breaks in the printing system for which the web tension data was collected and that webs associated with the "A" log position of a particular mill site and paper making machine are highly correlated with web breaks. Also, using an infeed tension above 1.88 PLI may result in an increase in web breaks and this tension range should, therefore, be avoided.

Based on the above results, the operator of or a controller (e.g., the controller 17 of FIG. 1) connected to the printing system for which the data was collected may keep the ratio of the drag tension to the infeed tension at approximately 0.95 to reduce the occurrence of web breaks. Thus, if the drag tension must be increased for some reason, the infeed tension should also be increased to keep the ratio of these tensions at approximately 0.95.

Likewise, the printing system operator may contact the web manufacturer to inform the web manufacturer that there may be a problem with the webs made from the "A" log position of a particular machine at a particular mill site and/or may refuse to purchase such webs to reduce the occurrence of web breaks.

Of course other induction trees can be produced to determine other correlations between one or more printing attributes (such as web tensions) and web manufacturing attributes (such as mill site, log position, web tensile strength, web moisture content, coefficient of friction, etc.) as well as to determine other web tension ratio values or ranges. In some cases, different values or ranges for the same web tension ratio may be determined. In these cases, the different values or ranges may be combined into a single range or, alternatively, a single "best" value or range may be determined from the different values or ranges in any desired manner (e.g., averaging). Furthermore, if desired, other types of analyses could be performed to determine correlations between one or more printing and/or web manufacturing attributes and the occurrence of web breaks or other problems in a printing system and to determine appropriate web tension ratios for decreasing the occurrence of web breaks in a printing system. Other such systems include, but are not limited to, standard correlation analyses, neural networks, fuzzy logic systems, or any expert system that stores and uses data pertaining to one or more such attributes for printing runs in which the problem occurred and for printing runs in which the problem did not occur. The commercial software product known as KnowledgeSEEKER (manufactured by Angoss Software International Limited) is one such expert system.

Of course, when determining an appropriate web tension ratio range, the system preforming the correlation analysis may store data indicating the web tensions at particular web locations and use this data to determine an appropriate web tension ratio range as, for example, described above and illustrated in FIG. 6 with respect to the drag tension to infeed tension ratio. In some cases, the correlation analysis may also use, for example, appropriate software to calculate web tension ratios from the stored web tension data and to determine correlations between these calculated web tension ratios and web breaks. Alternatively, the database may store web tension ratios directly and these web tension ratios may be used to determine one or more appropriate web tension ratio values and/or ranges.

While the present invention is specifically described herein for the purpose of identifying the causes of and reducing the occurrence of web breaks in a printing system that prints on a paper web, the attributes and methods described herein may be equally used to identify the causes of and to decrease the occurrence of web breaks in any other types of printing systems including, for example, those which print on fabric webs, wallpaper webs, linoleum webs, sheet metal webs, etc. Likewise, the same attributes and methods described herein may be used to identify the causes of and to reduce the occurrence of other problems within a printing system including, for example, web defects.

Numerous modifications and alternative embodiments of the invention will be apparent to those skilled in the art in view of the foregoing description. Accordingly, this description is to be construed as illustrative only and not as limiting to the scope of the invention. The details of the structure may be varied substantially without departing from the spirit of the invention, and the exclusive use of all modifications, which are within the scope of the appended claims, is reserved.

It is claimed:

1. A device for determining conditions under which a break in a web of a printing system is more likely to occur, comprising:
    a database that stores web manufacturing data indicating a manufacturing attribute of each web used in each of a plurality of printing runs, wherein a web break occurred in some of the plurality of printing runs and did not occur in others of the plurality of printing runs; and
    a computer that implements a correlation analysis to determine if there is a correlation between the manufacturing attribute and the occurrence of a web break.

2. The device of claim 1, wherein the database stores web manufacturing data indicating a mill site at which each of the webs of each of the plurality of printing runs was manufactured.

3. The device of claim 1, wherein the database stores web manufacturing data indicating a particular web manufacturing machine on which each of the webs of each of the plurality of printing runs was manufactured.

4. The device of claim 1, wherein the database stores web manufacturing data indicating a date on which each of the webs of each of the plurality of printing runs was manufactured.

5. The device of claim 1, wherein the database stores web manufacturing data indicating a reel set on which each of the webs of each of the plurality of printing runs was manufactured.

6. The device of claim 1, wherein the database stores web manufacturing data indicating a reel number on which each of the webs of each of the plurality of printing runs was manufactured.

7. The device of claim 1, wherein the database stores web manufacturing data indicating a log position at which each of the webs of each of the plurality of printing runs was manufactured.

8. The device of claim 1, wherein the database stores web manufacturing data indicating an auxiliary machine that was used during manufacture of each of the webs of each of the plurality of printing runs.

9. The device of claim 1, wherein the database stores web manufacturing data indicating a tensile strength of each of the webs of each of the plurality of printing runs.

10. The device of claim 1, wherein the database stores web manufacturing data indicating a moisture content of each of the webs of each of the plurality of printing runs.

11. The device of claim 1, wherein the database stores web manufacturing data indicating a coefficient of friction of each of the webs of each of the plurality of printing runs.

12. The device of claim 1, wherein the database stores web manufacturing data indicating a multiplicity of manufacturing attributes of each web used in the plurality of printing runs and wherein the computer therefor, includes means for determining if there is a correlation between any of the multiplicity of manufacturing attributes and the occurrence of a web break.

13. The device of claim 12, wherein two or more of the web manufacturing attributes comprise different ones of a mill site, a date, a paper making machine, an auxiliary machine, a reel set, a reel number, a log position, a tensile strength and a moisture content associated with the manufacture of each of the webs of each of the plurality of printing runs.

14. The device of claim 1, wherein the correlation algorithm is a decision-tree induction algorithm that creates an induction tree using the web manufacturing data.

15. The device of claim 1, further including an output device that displays the correlation between the web manufacturing attribute and the occurrence of a web break when the correlation is determined.

16. The device of claim 1, wherein the database further stores printing data related a printing attribute associated with each of the plurality of printing runs and wherein the computer-therefor; and includes means for determining if there is a correlation between a combination the web manufacturing attribute and the printing attribute and the occurrence of a web break.

17. The device of claim 16, wherein the printing attribute comprises a web tension.

18. The device of claim 16, wherein the printing attribute comprises a ratio of web tensions at different locations within the printing system.

19. The device of claim 1, wherein the web manufacturing data comprises paper web manufacturing data.

20. The device of claim 1, wherein the computer performs an induction-type analysis to determine the correlation between the manufacturing attribute and the occurrence of a web break.

21. The device of claim 1, wherein the computer performs a fuzzy logic analysis to determine the correlation between the manufacturing attribute and the occurrence of a web break.

22. A method for use in detecting the occurrence of a problem in a web of a printing system, comprising the steps of:
    collecting data identifying a web manufacturing attribute associated with the manufacture of printing webs used during a plurality of printing runs of the printing system, wherein the web problem occurred during some of the plurality of printing runs and did not occur during others of the plurality of printing runs; and
    using a correlation-therefor analysis to determine if the web manufacturing attribute is correlated with the occurrence of the web problem during the plurality of printing runs.

23. The method of claim 22, wherein the step of using an analysis includes the step of developing an induction tree to determine if the web manufacturing attribute is correlated with the occurrence of the web problem during the plurality of printing runs.

24. The method of claim 22, wherein the step of collecting includes the step of ascertaining data indicating a mill site at which each of the webs was manufactured.

25. The method of claim 22, wherein the step of collecting includes the step of ascertaining data indicating a web manufacturing machine on which each of the webs was manufactured.

26. The method of claim 22, wherein the step of collecting includes the step of ascertaining data indicating a date on which each of the webs was manufactured.

27. The method of claim 22, wherein the step of collecting includes the step of ascertaining data indicating a reel set on which each of the webs was manufactured.

28. The method of claim 22, wherein the step of collecting includes the step of ascertaining data indicating a reel number on which each of the webs was manufactured.

29. The method of claim 22, wherein the step of collecting includes the step of ascertaining data indicating a log position at which each of the webs was manufactured.

30. The method of claim 22, wherein the step of collecting includes the step of ascertaining data indicating an auxiliary machine that was used during manufacture of each of the webs.

31. The method of claim 22, wherein the step of collecting includes the step of ascertaining data indicating a tensile strength of each of the webs.

32. The method of claim 22, wherein the step of collecting includes the step of ascertaining data indicating a moisture content of each of the webs.

33. The method of claim 22, wherein the step of collecting includes the step of ascertaining data indicating a coefficient of friction of each of the webs.

34. The method of claim 22, wherein the step of collecting includes the step of ascertaining data indicating two web manufacturing attributes comprising different ones of a mill site, a web manufacturing machine, a date, a reel set, a reel number, a log position, an auxiliary machine, a tensile strength, a moisture content and a coefficient of friction associated with the manufacture of each of the webs and wherein the step of using includes the step of determining if any of the web manufacturing attributes is correlated to the occurrence of the web problem during the plurality of printing runs.

35. The method of claim 22, further including the step of notifying a web manufacturer when a correlation is determined between the web manufacturing attribute and the occurrence of the web problem.

36. The method of claim 22, further including the step of changing a web manufacturing condition when a correlation is determined between the web manufacturing attribute and the occurrence of the web problem.

37. The method of claim 22, wherein the web problem is a web break.

38. The method of claim 22, wherein the correlation analysis is an induction-type analysis.

39. The method of claim 22, wherein the correlation analysis is a decision-tree induction analysis.

* * * * *

UNITED STATES PATENT AND TRADEMARK OFFICE
CERTIFICATE OF CORRECTION

PATENT NO.   : 6,098,063
DATED        : August 1, 2000
INVENTOR(S)  : Xie et al.

It is certified that error appears in the above-identified patent and that said Letters Patent is hereby corrected as shown below:

<u>Title page,</u>
Item [54], Title, should be -- DEVICE AND METHOD FOR IDENTIFYING CAUSES OF WEB BREAKS IN A PRINTING SYSTEM BASED ON WEB MANUFACTURING ATTRIBUTES. --

<u>Column 1,</u>
Line 3, "system on" should be -- system based on. --

Signed and Sealed this

Twenty-eighth Day of June, 2005

JON W. DUDAS
*Director of the United States Patent and Trademark Office*